United States Patent
Steinmetz et al.

(10) Patent No.: US 10,472,541 B2
(45) Date of Patent: Nov. 12, 2019

(54) POLYETHER-BASED REACTION PRODUCTS AND AQUEOUS BASECOAT MATERIALS COMPRISING SAID PRODUCTS

(71) Applicant: BASF Coatings GmbH, Muenster (DE)

(72) Inventors: Bernhard Steinmetz, Ruetschenhausen (DE); Peter Hoffmann, Senden (DE); Hardy Reuter, Muenster (DE)

(73) Assignee: BASF Coatings GmbH, Muenster (DE)

( * ) Notice: Subject to any disclaimer, the term of this patent is extended or adjusted under 35 U.S.C. 154(b) by 202 days.

(21) Appl. No.: 15/322,321

(22) PCT Filed: Jun. 16, 2015

(86) PCT No.: PCT/EP2015/063432
§ 371 (c)(1),
(2) Date: Dec. 27, 2016

(87) PCT Pub. No.: WO2016/000952
PCT Pub. Date: Jan. 7, 2016

(65) Prior Publication Data
US 2017/0158907 A1   Jun. 8, 2017

(30) Foreign Application Priority Data
Jul. 1, 2014 (EP) .................................. 14175116

(51) Int. Cl.
| | |
|---|---|
| *C09D 175/04* | (2006.01) |
| *C08G 18/48* | (2006.01) |
| *C08G 18/50* | (2006.01) |
| *C08G 18/10* | (2006.01) |
| *C08G 18/12* | (2006.01) |
| *C08L 75/04* | (2006.01) |
| *B05D 1/04* | (2006.01) |
| *B05D 7/00* | (2006.01) |
| *C08G 18/24* | (2006.01) |
| *C08G 18/75* | (2006.01) |
| *C08G 18/76* | (2006.01) |

(52) U.S. Cl.
CPC .............. *C09D 175/04* (2013.01); *B05D 1/04* (2013.01); *B05D 7/572* (2013.01); *C08G 18/10* (2013.01); *C08G 18/12* (2013.01); *C08G 18/242* (2013.01); *C08G 18/48* (2013.01); *C08G 18/4854* (2013.01); *C08G 18/5045* (2013.01); *C08G 18/755* (2013.01); *C08G 18/758* (2013.01); *C08G 18/7642* (2013.01); *C08L 75/04* (2013.01)

(58) Field of Classification Search
CPC .............. C09D 175/04; C08G 18/7642; C08G 18/6854; C08G 18/242; C08G 18/755; C08G 18/758; B05D 1/04; B05D 7/562
USPC ......................................................... 524/589
See application file for complete search history.

(56) References Cited

U.S. PATENT DOCUMENTS

| | | | |
|---|---|---|---|
| 6,632,915 B1 | 10/2003 | Schwarte et al. | |
| 2009/0182113 A1* | 7/2009 | Rodewald | C08G 18/10 528/61 |
| 2012/0015574 A1* | 1/2012 | Severich | C08G 18/0814 442/79 |
| 2014/0030528 A1 | 1/2014 | Kitagawa et al. | |

FOREIGN PATENT DOCUMENTS

| | | |
|---|---|---|
| DE | 40 09 858 A1 | 10/1991 |
| DE | 44 37 535 A1 | 4/1996 |
| DE | 199 14 896 A1 | 10/2000 |
| DE | 199 30 665 A1 | 1/2001 |
| DE | 199 48 004 A1 | 7/2001 |
| DE | 100 43 405 C1 | 6/2002 |
| EP | 0 228 003 A1 | 7/1987 |
| EP | 0 521 928 B1 | 8/1994 |
| EP | 0 634 431 A1 | 1/1995 |
| WO | WO 92/15405 A1 | 9/1992 |

OTHER PUBLICATIONS

International Search Report dated Jul. 21, 2015 in PCT/EP2015/063432 (with English translation).
International Preliminary Report on Patentability and Written Opinion of the International Searching Authority dated Jan. 3, 2017 in PCT/EP2015/063432 filed Jun. 16, 2015 (with English translation).

* cited by examiner

*Primary Examiner* — Hui H Chin
(74) *Attorney, Agent, or Firm* — Oblon, McClelland, Maier & Neustadt, L.L.P.

(57) ABSTRACT

The present invention relates to a pigmented aqueous basecoat material comprising a polyether-based reaction product which is preparable by reaction of
(a) at least one diisocyanate of the formula (I)

$$\text{OCN—Y—NCO} \qquad (I)$$

in which
Y is a divalent aliphatic, aromatic or araliphatic hydrocarbon radical having from 6 to 30 carbon atoms,
with
(b) at least one polyether of the general structural formula (II)

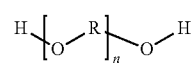

(II)

in which
R is a $C_3$ to $C_6$ alkylene radical and n is selected accordingly such that the polyether (b) possesses a number-average molecular weight of 200 to 4000 g/mol,
where components (a) and (b) are used in the reaction in a molar ratio of 0.7/2.3 to 1.6/1.7 and the resulting reaction product possesses a number-average molecular weight of 500 to 15 000 g/mol and an isocyanate content of less than 0.2%.

14 Claims, No Drawings

POLYETHER-BASED REACTION PRODUCTS AND AQUEOUS BASECOAT MATERIALS COMPRISING SAID PRODUCTS

The present invention relates to innovative polyether-based reaction products. It further relates to aqueous basecoat materials which comprise the reaction products, and to the use of said reaction products in aqueous basecoat materials. It also relates to a method for producing multicoat paint systems using aqueous basecoat materials, and also to the multicoat paint systems producible by means of said method.

PRIOR ART

A multiplicity of methods are known for producing multicoat color and/or effect paint systems (also called multicoat coatings or multiple-coat finishes). The prior art discloses (cf., for example, German patent application DE 199 48 004 A1, page 17 line 37 to page 19 line 22, or German patent DE 100 43 405 C1, column 3 paragraph [0018], and column 8 paragraph [0052] to column 9 paragraph [0057], in conjunction with column 6 paragraph [0039] to column 8 paragraph [0050]), for example, the following method in which:

(1) a pigmented aqueous basecoat material is applied to a substrate,
(2) a polymer film is formed from the coating material applied in stage (1),
(3) a clearcoat material is applied to the resulting basecoat film, and then
(4) the basecoat film is cured together with the clearcoat film.

This method is widely employed, for example, for the OEM finishing of automobiles, and also for the painting of metal and plastic ancillary components. The current requirements imposed on the applications-technological and esthetic properties of such paint systems (coatings) are immense.

One problem which arises again and again, and yet has still not been satisfactorily solved by the prior art, is the incidence of what are called pinholes—i.e., the insufficient stability toward pinholes. On successive application of a number of coating materials—basecoat and clearcoat, for example—and in the absence of separate curing of each of the individual polymer films, there may be unwanted inclusions of air, solvent and/or moisture, which may become perceptible in the form of bubbles beneath the surface of the overall paint system, and may break open in the course of the final curing. The holes that are formed in the paint system as a result, also called pinholes, lead to a disadvantageous visual appearance. The amount of organic solvents and/or water obtained as a result of the overall construction of basecoat film and clearcoat film, and also the quantity of air introduced by the application procedure, are too great to be able to escape from the multicoat paint system completely within a final curing step without the generation of defects. The properties of the basecoat material, which is particularly important in this context, and of the coating films produced from it are determined in particular by the binders and additives present in the basecoat material, examples being specific reaction products.

A further factor is that nowadays the replacement of coating materials based on organic solvents by aqueous coating materials is becoming ever more important in order to take account of the rising requirements for environmental friendliness.

Problem

The problem addressed by the present invention, therefore, was that of providing a reaction product which can be used to produce coatings which no longer have the above-identified disadvantages of the prior art. More particularly, the provision of a new reaction product and its use in aqueous basecoat materials ought to make it possible to provide coatings which exhibit outstanding stability toward pinholes and at the same time can be produced by use of aqueous basecoat materials, in an eco-friendly way.

Solution

The stated problems have been solved by a pigmented aqueous basecoat material which comprises a carboxy-functional polyether-based reaction product which is preparable by reaction of (a) at least one diisocyanate of the formula (I)

in which
Y is a divalent aliphatic, aromatic or araliphatic hydrocarbon radical having from 6 to 30 carbon atoms,
with
(b) at least one polyether of the general structural formula (II)

in which
R is a $C_3$ to $C_6$ alkylene radical and n is selected accordingly such that the polyether (b) possesses a number-average molecular weight of 200 to 4000 g/mol,
where components (a) and (b) are used in the reaction in a molar ratio of 0.7/2.3 to 1.6/1.7 and the resulting reaction product possesses a number-average molecular weight of 500 to 15 000 g/mol and an isocyanate content of less than 0.2%.

The condition that n is selected such that said polyether possesses a number-average molecular weight of 200 to 4000 g/mol may be illustrated as follows. Where, for example, R is a tetramethylene radical and the number-average molecular weight is to be 1000 g/mol, n is on average between 13 and 14. From the provisos given, the skilled person is perfectly well aware of how to prepare or select a corresponding reaction product. Apart from this, the description which follows on below, and especially the examples, provide additional information as well. The parameter n, then, just like the number-average molecular weight, is to be understood as a statistical average value.

The new basecoat material is also referred to below as basecoat material of the invention. Preferred embodiments of the basecoat material of the invention are apparent from the description which follows and from the dependent claims.

Likewise provided by the present invention is the reaction product itself and also the use of the reaction product in aqueous basecoat materials for improving the stability toward pinholes. The present invention relates not least to a method for producing a multicoat paint system on a substrate, and also to a multicoat paint system produced by said method.

Through the use of the reaction products of the invention, basecoat materials are obtained whose use in the production of coatings, more particularly multicoat paint systems, leads to outstanding stability toward pinholes. At the same time a high-level environmental profile is ensured. The reaction product of the invention and also the basecoat material of the invention can be used in the OEM finishing sector, particularly in the automobile industry sector, and in the automotive refinish sector.

Component (a)

The reaction product of the invention is preparable using at least one specific diisocyanate (a) of the formula (I) below.

OCN—Y—NCO             (I)

in which

Y is a divalent aliphatic, aromatic or araliphatic hydrocarbon radical having from 6 to 30 carbon atoms.

Aliphatic hydrocarbon radicals are, as is known, acyclic or cyclic, saturated or unsaturated hydrocarbon radicals which are not aromatic. They may of course also include both cyclic and acyclic structural units. Araliphatic hydrocarbon radicals are those which include both aliphatic and aromatic structural units.

Examples of diisocyanates (a) which can be used are hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate, 2-isocyanatopropylcyclohexyl isocyanate, dicyclohexylmethane 2,4'-diisocyanate, dicyclohexylmethane 4,4'-diisocyanate, 1,4- or 1,3-bis(isocyanato-methyl)cyclohexane, 1,4- or 1,3- or 1,2-diisocyanato-cyclohexane, 2,4- or 2,6-diisocyanato-1-methylcyclohexane, 2,2,4- or 2,4,4-trimethylhexa-methylene diisocyanate, 2,4- or 2,6-tolylene diisocyanate, diphenylmethane 2,2'-diisocyanate, diphenylmethane 2,4'-diisocyanate, diphenylmethane 4,4'-diisocyanate, naphthylene 1,5-diisocyanate, meta-xylylene diisocyanate and/or meta-tetramethylxylylene diisocyanate. Diisocyanates such as these are commercially available.

Preference is given to aromatic and araliphatic radicals Y and also to saturated aliphatic radicals Y. Preferably Y has a carbon atom number of 6 to 20, more particularly 6 to 15.

Especially preferred diisocyanates are meta-tetramethylxylylene diisocyanate (as araliphatic diisocyanate) and also isophorone diisocyanate and dicyclohexylmethane 4,4'-diisocyanate (as saturated aliphatic diisocyanates).

Component (b)

The reaction products of the invention may be prepared using at least one polyether of the general structural formula (II)

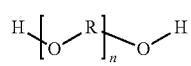

(II)

where R is a $C_3$ to $C_6$ alkyl radical. The index n is to be selected in each case such that said polyether possesses a number-average molecular weight of 200 to 4000 g/mol. It preferably possesses a number-average molecular weight of 300 to 3800 g/mol, more preferably of 400 to 3600 g/mol, and more particularly 500 to 3400 g/mol, and very preferably 800 to 3200 g/mol. Further preferred is a range from 800 to 1200 g/mol. The number-average molecular weight may for example be 1000 g/mol, 2000 g/mol, or 3000 g/mol. Unless specifically indicated otherwise, the number-average molecular weight in the context of the present invention is determined by means of vapor pressure osmosis. Measurement was carried out in the context of the present invention by means of a vapor pressure osmometer (model 10.00 from Knauer) on concentration series of the component under investigation in toluene at 50° C., with benzophenone as calibration substance for determination of the experimental calibration constant of the instrument employed (in accordance with E. Schröder, G. Müller, K.-F. Arndt, "Leitfaden der Polymercharakterisierung" [Introduction to polymer characterization], Akademie-Verlag, Berlin, pp. 47-54, 1982, in which benzil was used as calibration substance).

As is known, and as already explained earlier on above, the number-average molecular weight is always a statistical average value. The same, then, must also be true of the parameter n as per formula (I). The term polyether that requires explanation in this context and that is selected for the component (b) is understood as follows. Polymers, as for example polyethers (b), are always mixtures of molecules with different sizes. At least a portion, or all, of these molecules are distinguished by a sequence of identical or different monomer units (as a reacted form of monomers). The polymer or molecule mixture therefore in principle comprises molecules which comprise a plurality of (that is, at least two) identical or different monomer units. It will be appreciated that in the mixture there may also, proportionally, be the monomers themselves, in other words in their unreacted form. This is the reason alone, as is known, for the preparation reaction—that is, polymerization of monomers—that in general does not proceed with molecular uniformity. Whereas a defined monomer can be assigned a discrete molecular weight, a polymer, therefore, is always a mixture of molecules which differ in their molecular weights. A polymer, therefore, cannot be described by a discrete molecular weight, but instead is always assigned average molecular weights, as is known, such as the number-average molecular weight stated above, for example.

In the polyether for use in accordance with the invention it is possible for all n radicals R to be identical. It is likewise also possible, however, for different kinds of radicals R to be present. Preferably all the radicals R are identical.

R is preferably a $C_4$ alkylene radical. More preferably it is a tetramethylene radical.

With very particular preference the polyether for use in accordance with the invention is a linear polytetrahydrofuran which on average is diolic.

The Reaction Product

There are no peculiarities to the preparation of the reaction product of the invention. Components (a) and (b) may be linked to one another via common-knowledge methods. Accordingly, the isocyanate groups of component (a) are reacted with the hydroxyl groups of component (b). The reaction may take place, for example, in bulk or in solution with typical organic solvents at temperatures from, for example, 50° C. to 300° C. It is of course also possible for typical catalysts to be employed, such as sulfuric acid, sulfonic acids and/or tetraalkyl titanates, zinc and/or tin alkoxylates, dialkyltin oxides such as di-n-butyltin oxide, for example, or organic salts of the dialkyltin oxides.

The components (a) and (b) here are used in a molar ratio of 0.7/2.3 to 1.6/1.7, preferably of 0.8/2.2 to 1.6/1.8, and very preferably of 0.9/2.1 to 1.5/1.8.

For the reaction, the reaction product has an isocyanate content of less than 0.2%, thus meaning that virtually all the isocyanate groups are reacted. For this reason, component (b) is also used in a molar excess. The isocyanate content is preferably less than 0.15%, more particularly less than 0.1%. In the context of the present invention, the isocyanate content is determined in accordance with DIN EN ISO 11 909. Where reference is made in the context of the present invention to an official standard, this of course means the version of said standard that is currently valid on the filing date, or, if no current standard exists at that date, then the last current version of the standard.

The resulting reaction product possesses a number-average molecular weight of 500 to 15 000 g/mol, preferably 750 to 10 000 g/mol, very preferably 1000 to 7500 g/mol and more particularly 1250 to 5000 g/mol.

The reaction product of the invention is generally hydroxy-functional, preferably on average dihydroxy-functional.

Particularly preferred embodiments are specified below:

a) In one particularly preferred embodiment of the reaction product of the invention, for the diisocyanate (a), aromatic or araliphatic radicals and also saturated aliphatic radicals are selected as divalent radicals Y, and with further preference have a carbon atom number of 6 to 20, more particularly 6 to 15.

b) In another particularly preferred embodiment of the reaction product of the invention, the polyether for use in accordance with the invention is on average diolic polytetrahydrofuran and also possesses a number-average molecular weight of 800 to 3200 g/mol.

c) In another particularly preferred embodiment of the reaction product of the invention, components (a) and (b) are used in a molar ratio of 0.9/2.1 to 1.5/1.8.

d) In another particularly preferred embodiment of the reaction product of the invention, said product possesses an isocyanate content of less than 0.15%.

e) In another particularly preferred embodiment of the reaction product of the invention, said product possesses a number-average molecular weight of 1250 to 5000 g/mol.

In one especially preferred embodiment of the reaction product of the invention, all of the features indicated under a) to e) are realized in combination.

The Pigmented Aqueous Basecoat Material

The present invention further relates to a pigmented aqueous basecoat material which comprises at least one reaction product of the invention. All of the preferred embodiments stated above with regard to the reaction product also, of course, apply in respect of the basecoat material comprising the reaction product.

A basecoat material is a color-imparting intermediate coating material that is used in automotive finishing and general industrial painting. This basecoat material is generally applied to a metallic or plastics substrate which has been pretreated with a baked (fully cured) surfacer or primer-surfacer, or else, occasionally, is applied directly to the plastics substrate. Substrates used may also include existing paint systems, which may optionally require pretreatment as well (by abrading, for example). It has now become entirely customary to apply more than one basecoat film. Accordingly, in such a case, a first basecoat film constitutes the substrate for a second such film. A particular possibility in this context, instead of application to a coat of a baked surfacer, is to apply the first basecoat material directly to a metal substrate provided with a cured electrocoat, and to apply the second basecoat material directly to the first basecoat film, without separately curing the latter. To protect a basecoat film, or the uppermost basecoat film, from environmental effects in particular, at least an additional clearcoat film is applied over it. This is generally done in a wet-on-wet process—that is, the clearcoat material is applied without the basecoat film being cured. Curing then takes place, finally, jointly. It is now also widespread practice to produce only one basecoat film on a cured electrocoat film, then to apply a clearcoat material, and then to cure these two films jointly.

The sum total of the weight-percentage fractions, based on the total weight of the pigmented aqueous basecoat material, of all reaction products of the invention is preferably 0.1 to 30 wt %, more preferably 1 to 20 wt %, and very preferably 1.5 to 15 wt % or even 2 to 12 wt %.

Where the amount of the reaction product of the invention is below 0.1 wt %, it may be possible that no further improvement in stability with respect to pinholes is achieved. Where the amount is more than 30 wt %, there may in certain circumstances be disadvantages, such as incompatibility of said reaction product in the basecoat material, for example. Such incompatibility may be manifested, for example, in uneven leveling and also in floating or settling.

In the case of a possible particularization to basecoat materials comprising preferred reaction products in a specific proportional range, the following applies. The reaction products which do not fall within the preferred group may of course still be present in the basecoat material. In that case the specific proportional range applies only to the preferred group of reaction products. It is preferred nonetheless for the total proportion of reaction products, consisting of reaction products of the preferred group and reaction products which are not part of the preferred group, to be subject likewise to the specific proportional range.

In the case of restriction to a proportional range of 1.5 to 15 wt % and to a preferred group of reaction products, therefore, this proportional range evidently applies initially only to the preferred group of reaction products. In that case, however, it would be preferable for there to be likewise from 1.5 to 15 wt % in total present of all originally encompassed reaction products, consisting of reaction products from the preferred group and reaction products which do not form part of the preferred group. If, therefore, 5 wt % of reaction products of the preferred group are used, not more than 10 wt % of the reaction products of the nonpreferred group may be used.

The stated principle is valid, for the purposes of the present invention, for all stated components of the basecoat material and for their proportional ranges—for example, for the pigments, for the polyurethane resins as binders, or else for the crosslinking agents such as melamine resins.

The basecoat materials used in accordance with the invention comprise color and/or effect pigments. Such color pigments and effect pigments are known to those skilled in the art and are described, for example, in Römpp-Lexikon Lacke and Druckfarben, Georg Thieme Verlag, Stuttgart, N.Y., 1998, pages 176 and 451. The fraction of the pigments may be situated for example in the range from 1 to 40 wt %, preferably 2 to 30 wt %, more preferably 3 to 25 wt %, based on the total weight of the pigmented aqueous basecoat material.

Preferred basecoat materials in the context of the present invention are those which comprise, as binders, polymers curable physically, thermally, or both thermally and with actinic radiation. A "binder" in the context of the present invention and in accordance with relevant DIN EN ISO 4618 is the nonvolatile component of a coating composition, without pigments and fillers. Specific binders, accordingly, include, for example, typical coatings additives, the reaction product of the invention, or typical crosslinking agents described later on below, even if the expression is used primarily below in relation to particular polymers curable physically, thermally, or both thermally and with actinic radiation, as for example particular polyurethane resins.

Besides the reaction product of the invention, the pigmented aqueous basecoat materials of the invention more preferably comprise at least one polyurethane resin as binder. Coating materials of this kind comprising polyurethane resins may likewise customarily be cured physically, thermally, or both thermally and with actinic radiation.

In the context of the present invention, the term "physical curing" means the formation of a film through loss of solvent from polymer solutions or polymer dispersions. Typically, no crosslinking agents are necessary for this curing.

In the context of the present invention, the term "thermal curing" means the heat-initiated crosslinking of a coating film, with either a separate crosslinking agent or else self-crosslinking binders being employed in the parent coating material. The crosslinking agent contains reactive functional groups which are complementary to the reactive functional groups present in the binders. This is commonly referred to by those in the art as external crosslinking. Where the complementary reactive functional groups or autoreactive functional groups—that is, groups which react with groups of the same kind—are already present in the binder molecules, the binders present are self-crosslinking. Examples of suitable complementary reactive functional groups and autoreactive functional groups are known from German patent application DE 199 30 665 A1, page 7 line 28 to page 9 line 24.

For the purposes of the present invention, actinic radiation means electromagnetic radiation such as near infrared (NIR), UV radiation, more particularly UV radiation, and particulate radiation such as electron radiation. Curing by UV radiation is commonly initiated by radical or cationic photoinitiators. Where thermal curing and curing with actinic light are employed in unison, the term "dual cure" is also used.

In the present invention preference is given both to basecoat materials which cure physically and to basecoat materials which cure thermally or both thermally and with actinic radiation, i.e., by "dual cure".

Preferred thermally curing basecoat materials are those which comprise as binder a polyurethane resin, preferably a hydroxyl-containing polyurethane resin, and as crosslinking agent an aminoplast resin or a blocked or nonblocked polyisocyanate, preferably an aminoplast resin. Among the aminoplast resins, melamine resins are preferred.

The sum total of the weight-percentage fractions, based on the total weight of the pigmented aqueous basecoat material, of all crosslinking agents, preferably aminoplast resins and/or blocked and/or nonblocked polyisocyanates, more particularly preferably melamine resins, is preferably 1 to 20 wt %, more preferably 1.5 to 17.5 wt %, and very preferably 2 to 15 wt % or even 2.5 to 10 wt %.

The polyurethane resin preferably present may be ionically and/or nonionically hydrophilically stabilized. In preferred embodiments of the present invention the polyurethane resin is ionically hydrophilically stabilized. The preferred polyurethane resins are linear or contain instances of branching. The polyurethane resin is more preferably one in whose presence olefinically unsaturated monomers have been polymerized. This polyurethane resin may be present alongside the polymer originating from the polymerization of the olefinically unsaturated monomers, without these polymers being bonded covalently to one another. Equally, however, the polyurethane resin may also be bonded covalently to the polymer originating from the polymerization of the olefinically unsaturated monomers. The olefinically unsaturated monomers are preferably monomers containing acrylate groups and/or methacrylate groups. It is likewise preferred for the monomers containing acrylate and/or methacrylate groups to be used in combination with other olefinically unsaturated compounds which contain no acrylate or methacrylate groups. Olefinically unsaturated monomers attached to the polyurethane resin are more preferably monomers containing acrylate groups or methacrylate groups, thereby producing polyurethane (meth)acrylates. Very preferably the polyurethane resin is a polyurethane (meth)acrylate. The polyurethane resin present with preference is curable physically, thermally, or both thermally and with actinic radiation. More particularly it is curable either thermally or both thermally and with actinic radiation. With particular preference the polyurethane resin comprises reactive functional groups through which external crosslinking is possible.

Suitable saturated or unsaturated polyurethane resins are described, for example, in German patent application DE 199 14 896 A1, column 1, lines 29 to 49 and column 4, line 23 to column 11, line 5, German patent application DE 199 48 004 A1, page 4, line 19 to page 13, line 48, European patent application EP 0 228 003 A1, page 3, line 24 to page 5, line 40, European patent application EP 0 634 431 A1, page 3, line 38 to page 8, line 9, or international patent application WO 92/15405, page 2, line 35 to page 10, line 32.

The polyurethane resin is prepared using preferably the aliphatic, cycloaliphatic, aliphatic-cycloaliphatic, aromatic, aliphatic-aromatic and/or cycloaliphatic-aromatic polyisocyanates that are known to the skilled person.

As alcohol component for preparing the polyurethane resins, preference is given to using the saturated and unsaturated polyols of relatively high molecular mass and of low molecular mass, and also, optionally, monoalcohols, in minor amounts, that are known to the skilled person. Low molecular mass polyols used are more particularly diols and, in minor amounts, triols, for introducing instances of branching. Examples of suitable polyols of relatively high molecular mass are saturated or olefinically unsaturated polyester polyols and/or polyether polyols. Relatively high molecular mass polyols are more particularly polyester polyols, especially those having a number-average molecular weight of 400 to 5000 g/mol.

For hydrophilic stabilization and/or for increasing the dispersibility in aqueous medium, the polyurethane resin preferably present may contain particular ionic groups and/or groups which can be converted into ionic groups (potentially ionic groups). Polyurethane resins of this kind are referred to in the context of the present invention as ionically hydrophilically stabilized polyurethane resins. Likewise present may be nonionic hydrophilically modifying groups. Preferred, however, are the ionically hydrophilically stabilized polyurethanes. In more precise terms, the modifying groups are alternatively functional groups which can be converted to cations by neutralizing agents and/or quaternizing agents, and/or cationic groups (cationic modification) or functional groups which can be converted to anions by neutralizing agents, and/or anionic groups (anionic modification) and/or nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted to cationic groups by neutralizing agents and/or quaternizing agents). Mention should also be made of the cationic groups—groups prepared from the aforementioned functional groups using neutralizing agents and/or quaternizing agents known to those skilled in the art—such as primary, secondary, tertiary and/or quaternary ammonium groups, tertiary sulfonium groups and/or quaternary phosphonium groups, more particularly quaternary ammonium groups and tertiary sulfonium groups.

As is well known, the functional groups for anionic modification are, for example, carboxylic acid, sulfonic acid and/or phosphonic acid groups, more particularly carboxylic acid groups (functional groups which can be converted to anionic groups by neutralizing agents), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the (potentially) ionic groups. The nonionic modifications are introduced, for example, through the incorporation of poly(ethylene) oxide polymers as lateral or terminal groups in the polyurethane molecules. The hydrophilic modifications are introduced, for example, via compounds which contain at least one group reactive toward isocyanate groups, preferably at least one hydroxyl group. The ionic modification can be introduced using monomers which, as well as the modifying groups, contain at least one hydroxyl group. To introduce the nonionic modifications, preference is given to using the polyether diols and/or alkoxypoly(oxyalkylene) alcohols known to those skilled in the art.

The polyurethane resin may preferably be a graft polymer. More particularly it is a polyurethane resin grafted with olefinically unsaturated compounds, preferably olefinically unsaturated monomers. In this case, then, the polyurethane is grafted, for example, with side groups and/or side chains that are based on olefinically unsaturated monomers. These are more particularly side chains based on poly(meth)acrylates. Poly(meth)acrylates for the purposes of the present invention are polymers or polymeric radicals which comprise monomers containing acrylate and/or methacrylate groups, and preferably consist of monomers containing acrylate groups and/or methacrylate groups. Side chains based on poly(meth)acrylates are understood to be side chains which are constructed during the graft polymerization, using monomers containing (meth)acrylate groups. In the graft polymerization, preference here is given to using more than 50 mol %, more particularly more than 75 mol %, especially 100 mol %, based on the total amount of the monomers used in the graft polymerization, of monomers containing (meth)acrylate groups.

The side chains described are introduced into the polymer preferably after the preparation of a primary polyurethane resin dispersion. In this case the polyurethane resin present in the primary dispersion may contain lateral and/or terminal olefinically unsaturated groups via which, then, the graft polymerization with the olefinically unsaturated compounds proceeds. The polyurethane resin for grafting may therefore be an unsaturated polyurethane resin (A). The graft polymerization is in that case a radical polymerization of olefinically unsaturated reactants. Also possible, for example, is for the olefinically unsaturated compounds used for the graft polymerization to contain at least one hydroxyl group. In that case it is also possible first for there to be attachment of the olefinically unsaturated compounds via these hydroxyl groups through reaction with free isocyanate groups of the polyurethane resin. This attachment takes place instead of or in addition to the radical reaction of the olefinically unsaturated compounds with the lateral and/or terminal olefinically unsaturated groups optionally present in the polyurethane resin. This is then followed again by the graft polymerization via radical polymerization, as described earlier on above. The result in any case is polyurethane resins grafted with olefinically unsaturated compounds, preferably olefinically unsaturated monomers.

As olefinically unsaturated compounds with which the polyurethane resin (A) is preferably grafted it is possible to use virtually all radically polymerizable, olefinically unsaturated, and organic monomers which are available to the skilled person for these purposes. A number of preferred monomer classes may be specified by way of example:

hydroxyalkyl esters of (meth)acrylic acid or of other alpha,beta-ethylenically unsaturated carboxylic acids,
(meth)acrylic acid alkyl and/or cycloalkyl esters having up to 20 carbon atoms in the alkyl radical,
ethylenically unsaturated monomers comprising at least one acid group, more particularly exactly one carboxyl group, such as (meth)acrylic acid, for example,
vinyl esters of monocarboxylic acids which are branched in alpha-position and have 5 to 18 carbon atoms,
reaction products of (meth)acrylic acid with the glycidyl ester of a monocarboxylic acid which is branched in alpha-position and has 5 to 18 carbon atoms,
further ethylenically unsaturated monomers such as olefins (ethylene for example), (meth)acrylamides, vinylaromatic hydrocarbons (styrene for example), vinyl compounds such as vinyl chloride and/or vinyl ethers such as ethyl vinyl ether.

Used with preference are monomers containing (meth)acrylate groups, and so the side chains attached by grafting are poly(meth)acrylate-based side chains.

The lateral and/or terminal olefinically unsaturated groups in the polyurethane resin, via which the graft polymerization with the olefinically unsaturated compounds can proceed, are introduced into the polyurethane resin preferably via particular monomers. These particular monomers, in addition to an olefinically unsaturated group, also include, for example, at least one group that is reactive toward isocyanate groups. Preferred are hydroxyl groups and also primary and secondary amino groups. Especially preferred are hydroxyl groups.

The monomers described through which the lateral and/or terminal olefinically unsaturated groups may be introduced into the polyurethane resin may also, of course, be employed without the polyurethane resin being additionally grafted thereafter with olefinically unsaturated compounds. It is preferred, however, for the polyurethane resin to be grafted with olefinically unsaturated compounds.

The polyurethane resin preferably present may be a self-crosslinking and/or externally crosslinking binder. The polyurethane resin preferably comprises reactive functional groups through which external crosslinking is possible. In that case there is preferably at least one crosslinking agent in the pigmented aqueous basecoat material. The reactive functional groups through which external crosslinking is possible are more particularly hydroxyl groups. With particular advantage it is possible, for the purposes of the method of the invention, to use polyhydroxy-functional polyurethane resins. This means that the polyurethane resin contains on average more than one hydroxyl group per molecule.

The polyurethane resin is prepared by the customary methods of polymer chemistry. This means, for example, the polymerization of polyisocyanates and polyols to polyurethanes, and the graft polymerization that preferably then follows with olefinically unsaturated compounds. These methods are known to the skilled person and can be adapted individually. Exemplary preparation processes and reaction conditions can be found in European patent EP 0521 928 B1, page 2, line 57 to page 8, line 16.

The polyurethane resin preferably present preferably possesses a number-average molecular weight of 200 to 30 000 g/mol, more preferably of 2000 to 20 000 g/mol. It further possesses, for example, a hydroxyl number of 0 to 250 mg KOH/g, but more particularly from 20 to 150 mg KOH/g. The acid number of the polyurethane resin is preferably 5 to 200 mg KOH/g, more particularly 10 to 40 mg KOH/g. The hydroxyl number is determined in the context of the present invention in accordance with DIN 53240, the acid number in accordance with DIN 53402.

The polyurethane resin content is preferably between 5 and 80 wt %, more preferably between 8 and 70 wt %, and very preferably between 10 and 60 wt %, based in each case on the film-forming solids of the basecoat material.

By film-forming solids, corresponding ultimately to the binder fraction, is meant the nonvolatile weight fraction of the basecoat material, without pigments and, where appropriate, fillers. The film-forming solids can be determined as follows: A sample of the pigmented aqueous basecoat material (approximately 1 g) is admixed with 50 to 100 times the amount of tetrahydrofuran and then stirred for around 10 minutes. The insoluble pigments and any fillers are then removed by filtration and the residue is rinsed with a little THF, the THF being removed from the resulting filtrate on a rotary evaporator. The residue of the filtrate is dried at 120° C. for two hours and the resulting film-forming solids are obtained by weighing.

The sum total of the weight-percentage fractions, based on the total weight of the pigmented aqueous basecoat material, of all polyurethane resins is preferably 2 to 40 wt %, more preferably 2.5 to 30 wt %, and very preferably 3 to 20 wt %.

The pigmented aqueous basecoat material to be used may further comprise at least one polyester different from the reaction products of the invention, more particularly a polyester having a number-average molecular weight of 400 to 5000 g/mol, as binder. Such polyesters are described for example in DE 4009858 in column 6, line 53 to column 7, line 61 and column 10, line 24 to column 13, line 3.

There is preferably also a thickener present. Suitable thickeners are inorganic thickeners from the group of the sheet silicates. As well as the inorganic thickeners, however, it is also possible to use one or more organic thickeners. These are preferably selected from the group consisting of (meth)acrylic acid-(meth)acrylate copolymer thickeners, for example the commercial product Rheovis AS 5130 (BASF), and of polyurethane thickeners, for example the commercial product Rheovis PU 1250 (BASF). The thickeners used are different from the binders used.

Furthermore, the pigmented aqueous basecoat material may further comprise at least one adjuvant. Examples of such adjuvants are salts which can be decomposed thermally without residue or substantially without residue, resins as binders that are curable physically, thermally and/or with actinic radiation and are different from polyurethane resins, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and flatting agents.

Suitable adjuvants of the aforementioned kind are known, for example, from

German patent application DE 199 48 004 A1, page 14, line 4, to page 17, line 5, German patent DE 100 43 405 C1 column 5, paragraphs [0031] to [0033].

They are used in the customary and known amounts.

The solids content of the basecoat materials of the invention may vary according to the requirements of the case in hand. The solids content is guided primarily by the viscosity required for application, more particularly for spray application, and so may be adjusted by the skilled person on the basis of his or her general art knowledge, optionally with assistance from a few exploratory tests.

The solids content of the basecoat materials is preferably 5 to 70 wt %, more preferably 8 to 60 wt %, and very preferably 12 to 55 wt %.

By solids content (nonvolatile fraction) is meant that weight fraction which remains as a residue on evaporation under specified conditions. In the present application, the solids content, unless explicitly indicated otherwise, is determined in accordance with DIN EN ISO 3251. This is done by evaporating the basecoat material at 130° C. for 60 minutes.

Unless indicated otherwise, this test method is likewise employed in order to determine, for example, the fraction of various components of the basecoat material as a proportion of the total weight of the basecoat material. Thus, for example, the solids of a dispersion of a polyurethane resin which is to be added to the basecoat material may be determined correspondingly in order to ascertain the fraction of this polyurethane resin as a proportion of the overall composition.

The basecoat material of the invention is aqueous. The expression "aqueous" is known in this context to the skilled person. The phrase refers in principle to a basecoat material which is not based exclusively on organic solvents, i.e., does not contain exclusively organic-based solvents as its solvents but instead, in contrast, includes a significant fraction of water as solvent. "Aqueous" for the purposes of the present invention should preferably be understood to mean that the coating composition in question, more particularly the basecoat material, has a water fraction of at least 40 wt %, preferably at least 50 wt %, very preferably at least 60 wt %, based in each case on the total amount of the solvents present (i.e., water and organic solvents). Preferably in turn, the water fraction is 40 to 90 wt %, more particularly 50 to 80 wt %, very preferably 60 to 75 wt %, based in each case on the total amount of the solvents present.

The basecoat materials employed in accordance with the invention may be produced using the mixing assemblies and mixing techniques that are customary and known for producing basecoat materials.

The Method of the Invention and the Multicoat Paint System of the Invention

A further aspect of the present invention is a method for producing a multicoat paint system, where (1) a pigmented aqueous basecoat material is applied to a substrate, (2) a polymer film is formed from the coating material applied in stage (1), (3) a clearcoat material is applied to the resulting basecoat film, and then (4) the basecoat film is cured together with the clearcoat film, which comprises using in stage (1) a pigmented aqueous basecoat material which comprises at least one reaction product of the invention. All of the above observations relating to the reaction product of the invention and to the pigmented aqueous basecoat material are also valid in respect of the method of the invention. This is true more particularly also of all preferred, very preferred, and especially preferred features.

Said method is preferably used to produce multicoat color paint systems, effect paint systems, and color and effect paint systems.

The pigmented aqueous basecoat material used in accordance with the invention is commonly applied to metallic or plastics substrates that have been pretreated with surfacer or primer-surfacer. Said basecoat material may optionally also be applied directly to the plastics substrate.

Where a metallic substrate is to be coated, it is preferably further coated with an electrocoat system before the surfacer or primer-surfacer is applied.

Where a plastics substrate is being coated, it is preferably also pretreated before the surfacer or primer-surfacer is applied. The techniques most frequently employed for such pretreatment are those of flaming, plasma treatment, and corona discharge. Flaming is used with preference.

Application of the pigmented aqueous basecoat material of the invention to metallic substrates already coated, as described above, with cured electrocoat systems and/or surfacers may take place in the film thicknesses customary within the automobile industry, in the range, for example, of 5 to 100 micrometers, preferably 5 to 60 micrometers. This is done using spray application methods, for example compressed air spraying, airless spraying, high-speed rotation, electrostatic spray application (ESTA), alone or in conjunction with hot spray application, for example hot air spraying.

Following the application of the pigmented aqueous basecoat material, it can be dried by known methods. For example, (1-component) basecoat materials, which are preferred, can be flashed at room temperature for 1 to 60 minutes and subsequently dried, preferably at optionally slightly elevated temperatures of 30 to 90° C. Flashing and drying in the context of the present invention mean the evaporation of organic solvents and/or water, as a result of which the paint becomes drier but has not yet cured or not yet formed a fully crosslinked coating film.

Then a commercial clearcoat material is applied, by likewise common methods, the film thicknesses again being within the customary ranges, for example 5 to 100 micrometers.

After the clearcoat material has been applied, it can be flashed at room temperature for 1 to 60 minutes, for example, and optionally dried. The clearcoat material is then cured together with the applied pigmented basecoat material. In the course of these procedures, crosslinking reactions occur, for example, to produce on a substrate a multicoat color and/or effect paint system of the invention. Curing takes place preferably thermally at temperatures from 60 to 200° C. Thermally curing basecoat materials are preferably those which comprise as additional binder a polyurethane resin and as crosslinking agent an aminoplast resin or a blocked or nonblocked polyisocyanate, preferably an aminoplast resin. Among the aminoplast resins, melamine resins are preferred.

In one particular embodiment, the method for producing a multicoat paint system comprises the following steps:

producing a cured electrocoat film on the metallic substrate by electrophoretic application of an electrocoat material to the substrate and subsequent curing of the electrocoat material, producing (i) a basecoat film or (ii) a plurality of basecoat films directly following one another directly on the cured electrocoat film by (i) application of an aqueous basecoat material directly to the electrocoat film, or (ii) directly successive application of two or more basecoat materials to the electrocoat film, producing a clearcoat film directly on (i) the basecoat film or (ii) the uppermost basecoat film, by application of a clearcoat material directly to (i) one basecoat film or (ii) the uppermost basecoat film, where (i) one basecoat material or (ii) at least one of the basecoat materials is a basecoat material of the invention, joint curing of the basecoat film (i) or of the basecoat films (ii) and also of the clearcoat film.

In the latter embodiment, then, in comparison to the above-described standard methods, there is no application and separate curing of a commonplace surfacer. Instead, all of the films applied to the electrocoat film are cured jointly, thereby making the overall operation much more economical. Nevertheless, in this way, and particularly through the use of a basecoat material of the invention comprising a reaction product of the invention, multicoat paint systems are produced which have virtually no pinholes and hence are particularly visually outstanding. This is surprising in particular since with this method, within the concluding curing step, a particularly large quantity of organic solvents and/or water must escape from the system (since, indeed, there is no separate curing of a surfacer film), thereby greatly increasing the fundamental susceptibility to formation of pinholes.

The application of a coating material directly to a substrate or directly to a previously produced coating film is understood as follows: The respective coating material is applied in such a way that the coating film produced from it is disposed on the substrate (on the other coating film) and is in direct contact with the substrate (with the other coating film). Between coating film and substrate (other coating film), therefore, there is more particularly no other coat. Without the detail "direct", the applied coating film, while disposed on the substrate (the other film), need not necessarily be present in direct contact. More particularly, further coats may be disposed between them. In the context of the present invention, therefore, the following is the case: In the absence of particularization as to "direct", there is evidently no restriction to "direct".

Plastics substrates are coated basically in the same way as metallic substrates. Here, however, in general, curing takes place at significantly lower temperatures, of 30 to 90° C. Preference is therefore given to the use of two-component clearcoat materials. Furthermore, in this context, preference is given to use of basecoat materials which comprise a polyurethane resin as binder, but no crosslinker.

The method of the invention can be used to paint metallic and nonmetallic substrates, more particularly plastics substrates, preferably automobile bodies or components thereof.

The method of the invention can be used further for dual finishing in OEM finishing. This means that a substrate which has been coated by means of the method of the invention is painted for a second time, likewise by means of the method of the invention.

The invention relates further to multicoat paint systems which are producible by the method described above. These multicoat paint systems are to be referred to below as multicoat paint systems of the invention.

All of the above observations relating to the reaction product of the invention and to the pigmented aqueous basecoat material are also valid in respect of said multicoat paint system and of the method of the invention. This is also true especially of all the preferred, more preferred and most preferred features.

The multicoat paint systems of the invention are preferably multicoat color paint systems, effect paint systems, and color and effect paint systems.

A further aspect of the invention relates to the method of the invention, wherein said substrate from stage (1) is a multicoat paint system having defects. This substrate/multicoat paint system, which possesses defects, is therefore an original finish, which is to be repaired or completely recoated.

The method of the invention is suitable accordingly for repairing defects on multicoat paint systems. Film defects are generally faults on and in the coating, usually named according to their shape or their appearance. The skilled person is aware of a host of possible kinds of such film defects. They are described for example in Römpp-Lexikon Lacke and Druckfarben, Georg Thieme Verlag, Stuttgart, N.Y., 1998, page 235, "Film defects".

The multicoat paint systems produced by means of the method of the invention may likewise have such defects. In one preferred embodiment of the method of the invention, therefore, the substrate from stage (1) is a multicoat paint system of the invention which exhibits defects.

These multicoat paint systems are produced preferably on automobile bodies or parts thereof, by means of the method of the invention, identified above, in the context of automotive OEM finishing. Where such defects occur directly after OEM finishing has taken place, they are repaired immediately. The term "OEM automotive refinishing" is therefore also used. Where only small defects require repair, only the "spot" is repaired, and the entire body is not completely recoated (dual coating). The former process is called "spot repair". The use of the method of the invention for remedying defects on multicoat paint systems (original finishes) of the invention in OEM automotive refinishing, therefore, is particularly preferred.

Where reference is made, in the context of the present invention, to the automotive refinish segment, in other words when the repair of defects is the topic, and the substrate specified is a multicoat paint system possessing defects, this of course means that this substrate/multicoat paint system with defects (original finish) is generally located on a plastic substrate or on a metallic substrate as described above.

So that the repaired site has no color difference from the rest of the original finish, it is preferred for the aqueous basecoat material used in stage (1) of the method of the invention for repairing defects to be the same as that which was used to produce the substrate/multicoat paint system with defects (original finish).

The observations above concerning the polymer of the invention and the aqueous pigmented basecoat material therefore are also valid for the use, under discussion, of the method of the invention for repairing defects on a multicoat paint system. This is also true in particular of all stated preferred, very preferred, and especially preferred features. It is additionally preferred for the multicoat paint systems of the invention that are to be repaired to be multicoat color paint systems, effect paint systems, and color and effect paint systems.

The above-described defects on the multicoat paint system of the invention can be repaired by means of the above-described method of the invention. For this purpose, the surface to be repaired on the multicoat paint system may initially be abraded. The abrading is preferably performed by partially sanding, or sanding off, only the basecoat and the clearcoat from the original finish, but not sanding off the primer layer and surfacer layer that are generally situated beneath them. In this way, during the refinish, there is no need in particular for renewed application of specialty primers and primer-surfacers. This form of abrading has become established especially in the OEM automotive refinishing segment, since here, in contrast to refinishing in a workshop, generally speaking, defects occur only in the basecoat and/or clearcoat region, but do not, in particular, occur in the region of the underlying surfacer and primer coats. Defects in the latter coats are more likely to be encountered in the workshop refinish sector. Examples include paint damage such as scratches, which are produced, for example, by mechanical effects and which often extend down to the substrate surface (metallic or plastic substrate).

After the abrading procedure, the pigmented aqueous basecoat material is applied to the defect site in the original finish by pneumatic atomization. After the pigmented aqueous basecoat material has been applied, it can be dried by known methods. For example, the basecoat material may be dried at room temperature for 1 to 60 minutes and subsequently dried at optionally slightly elevated temperatures of 30 to 80° C. Flashing and drying for the purposes of the present invention means evaporation of organic solvents and/or water, whereby the coating material is as yet not fully cured. For the purposes of the present invention it is preferred for the basecoat material to comprise a polyurethane resin as binder and an aminoplast resin, preferably a melamine resin, as crosslinking agent.

A commercial clearcoat material is subsequently applied, by techniques that are likewise commonplace. Following application of the clearcoat material, it may be flashed off at room temperature for 1 to 60 minutes, for example, and optionally dried. The clearcoat material is then cured together with the applied pigmented basecoat material.

In the case of so-called low-temperature baking, curing takes place preferably at temperatures of 20 to 90° C. Preference here is given to using two-component clearcoat materials. If, as described above, a polyurethane resin is used as further binder and an aminoplast resin is used as crosslinking agent, there is only slight crosslinking by the aminoplast resin in the basecoat film at these temperatures. Here, in addition to its function as a curing agent, the aminoplast resin also serves for plasticizing and may assist pigment wetting. Besides the aminoplast resins, nonblocked isocyanates may also be used. Depending on the nature of the isocyanate used, they crosslink at temperatures from as low as 20° C.

In the case of what is called high-temperature baking, curing is accomplished preferably at temperatures of 130 to 150° C. Here both one-component and two-component clearcoat materials are used. If, as described above, a polyurethane resin is used as further binder and an aminoplast resin is used as crosslinking agent, there is crosslinking by the aminoplast resin in the basecoat film at these temperatures.

For repairing defects on multicoat paint systems, in other words when the substrate is an original finish with defects, preferably a multicoat paint system of the invention that exhibits defects, the low-temperature baking is preferably employed.

A further aspect of the present invention is the use of the reaction product of the invention in pigmented aqueous basecoat materials for improving the stability with respect to optical defects, more particularly pinholes.

The quality of the stability with respect to pinholes may be determined in principle using the pinholing limit and also the number of pinholes. The pinholing limit and its determination may be described as follows: In the construction of a multicoat paint system, the film thickness of a basecoat film disposed beneath the clearcoat film is varied, and, moreover, this basecoat film is not baked separately, but is instead baked together with the clearcoat film. This coating film may be, for example, a film disposed directly on the electrocoat film and/or a film disposed directly beneath the clearcoat film. It follows from the introductory remarks that the tendency to form pinholes must increase as the thickness of this film goes up, since correspondingly larger amounts of air, of organic solvents and/or of water are required to escape from the film. The film thickness of this film at which pinholes become apparent is referred to as the pinholing limit. The higher the pinholing limit, the better, evidently, is the quality of the stability with respect to pinholes. The number of pinholes as well is of course an expression of the quality of the stability with respect to pinholes.

The invention is illustrated below using examples.

EXAMPLES

Specification of Particular Components and Measurement Methods
Polyester 1 (P1):
Prepared in accordance with example D, column 16, lines 37 to 59 of DE 4009858 A, using butyl glycol instead of butanol as organic solvent, the solvents present thus being butyl glycol and water. The corresponding dispersion of the polyester has a solids content of 60 wt %.
Determination of the Number-Average Molecular Weight:
The number-average molecular weight was determined by means of vapor pressure osmosis. Measurement was effected using a vapor pressure osmometer (model 10.00 from Knauer) on concentration series of the component under investigation in toluene at 50° C., with benzophenone as calibration substance for determination of the experimental calibration constant of the instrument employed (in accordance with E. Schröder, G. Müller, K.-F. Arndt, "Leitfaden der Polymercharakterisierung" [Introduction to polymer characterization], Akademie-Verlag, Berlin, pp. 47-54, 1982, in which, though, benzil was used as calibration substance).
Production of Inventive Reaction Products (IR):
IR1:
In a 4 l stainless steel reactor equipped with anchor stirrer, thermometer and condenser, 183.20 g of meta-tetramethylenexylylene diisocyanate (TMXDI from Cytec) (0.75 mol), 1500 g of PolyTHF1000 (BASF SE) with an OH number of 111.0 mg KOH/g (1.5 mol), 1120 g of methyl ethyl ketone and 0.80 g of dibutyltin dilaurate were weighed out (OH number determined according to DIN 53240). The mixture is heated to 80° C. with stirring. The progress of the reaction was monitored by titration to determine the level of NCO groups. Where an NCO content of less than/equal to 0.1% had been reached, 130 g of butanol were added to the reaction mixture. The mixture was then stirred at the stated temperature for a further hour. The methyl ethyl ketone needed for the reaction was subsequently stripped off under reduced pressure. This gives a resin which is crystalline at room temperature and has an acid number of 0.15 mg KOH/g (in accordance with DIN 53402). The solids content of the resin is 98.0% (measured at 130° C. for 1 hour in a forced air oven on a 1 g sample with addition of 1 ml of methyl ethyl ketone). The number-average molecular weight was determined at the polymer.

Number-average molecular weight: 1940 g/mol
Viscosity (70% strength in butyl glycol): 600 mPas, (measured at 23° C. using a rotational viscometer from Brookfield, model CAP 2000+, spindle 3, shear rate: 5000 s$^{-1}$)
IR2:
In a 4 l stainless steel reactor equipped with anchor stirrer, thermometer and condenser, 166.72 g of isophorone diisocyanate (0.75 mol), 1500 g of PolyTHF1000 (BASF SE) with an OH number of 111.0 mg KOH/g (1.5 mol), 1122 g of methyl ethyl ketone and 0.83 g of dibutyltin dilaurate were weighed out (OH number determined according to DIN 53240). The mixture is heated to 80° C. with stirring. The progress of the reaction was monitored by titration to determine the level of NCO groups. Where an NCO content of less than/equal to 0.1% had been reached, 130 g of butanol were added to the reaction mixture. The mixture was then stirred at the stated temperature for a further hour. The methyl ethyl ketone needed for the reaction was subsequently stripped off under reduced pressure.

This gives a resin which is crystalline at room temperature and has an acid number of 0.15 mg KOH/g (in accordance with DIN 53402). The solids content of the resin is 100.0% (measured at 130° C. for 1 hour in a forced air oven on a 1 g sample with addition of 1 ml of methyl ethyl ketone). The number-average molecular weight was determined at the polymer.

Number-average molecular weight: 1970 g/mol
Viscosity (70% strength in butyl glycol): 712 mPas, (measured at 23° C. using a rotational viscometer from Brookfield, model CAP 2000+, spindle 3, shear rate: 5000 s$^{-1}$)
IR3:
In a 4 l stainless steel reactor equipped with anchor stirrer, thermometer and condenser, 244.0 g of bis(4-isocyanatocyclohexyl) methane (Desmodur-W® from Bayer Material Science) (0.93 mol), 1860 g of PolyTHF1000 (BASF SE) with an OH number of 111.0 mg KOH/g (1.86 mol), 1391 g of methyl ethyl ketone and 1.08 g of dibutyltin dilaurate were weighed out (OH number determined according to DIN 53240). The mixture is heated to 80° C. with stirring. The progress of the reaction was monitored by titration to determine the level of NCO groups. Where an NCO content of less than/equal to 0.1% had been reached, 130 g of butanol were added to the reaction mixture. The mixture was then stirred at the stated temperature for a further hour. The methyl ethyl ketone needed for the reaction was subsequently stripped off under reduced pressure. This gives a resin which is crystalline at room temperature and has an acid number of 0.10 mg KOH/g (in accordance with DIN 53402). The solids content of the resin is 99.5% (measured at 130° C. for 1 hour in a forced air oven on a 1 g sample with addition of 1 ml of methyl ethyl ketone). The number-average molecular weight was determined at the polymer.

Number-average molecular weight: 1995 g/mol
Viscosity (70% strength in butyl glycol): 1012 mPas, (measured at 23° C. using a rotational viscometer from Brookfield, model CAP 2000+, spindle 3, shear rate: 5000 s$^{-1}$)

Production of Aqueous Basecoat Materials

Production of a Silver Comparative Waterborne Basecoat 1 (C1)

The components listed under "aqueous phase" in table A were stirred together in the order stated to form an aqueous mixture. In the next step an organic mixture was prepared from the components listed under "organic phase". The organic mixture was added to the aqueous mixture. The combined mixture was then stirred for 10 minutes and adjusted, using deionized water and dimethylethanolamine, to a pH of 8 and to a spray viscosity of 58 mPas under a shearing load of 1000 s$^{-1}$ as measured with a rotary viscometer (Rheomat RM 180 instrument from Mettler-Toledo) at 23° C.

TABLE A

| Component | Parts by weight |
|---|---|
| Aqueous phase | |
| 3% Na—Mg phyllosilicate solution | 26 |
| Deionized water | 13.6 |
| Butyl glycol | 2.8 |
| Polyurethane-modified polyacrylate; prepared as per page 7, line 55 to page 8, line 23 of DE 4437535 A | 4.5 |
| 50% strength by weight solution of Rheovis PU 1250 (BASF), rheological agent | 0.6 |
| P1 | 3.2 |
| TMDD (BASF) | 0.3 |
| melamine-formaldehyde resin (Cymel 203 from Cytec) | 4.1 |
| 10% dimethylethanolamine in water | 0.3 |
| polyurethane-based graft copolymer; prepared as per page 19, line 44 to page 20, line 21 of DE 19948004 A, solids content adjusted to 32.5 wt % with deionized water | 20.4 |
| TMDD (BASF) | 1.6 |
| 3% strength by weight aqueous Rheovis AS S130 solution; rheological agent, available from BASF | 3.9 |
| Organic phase | |
| Mixture of two commercial aluminum pigments, available from Altana-Eckart | 6.2 |
| Butyl glycol | 7.5 |
| P1 | 5 |

Production of Inventive Waterborne Basecoat Materials 1 to 3 (I1 to I3)

To produce the inventive waterborne basecoat material I1, a paint was produced as for the production of the comparative waterborne basecoat material 1 (C1), using IR1, instead of the polyester P1, both in the aqueous phase and in the organic phase. IR1 here was used as obtained in accordance with the example above. Based on the solids fraction (nonvolatile fraction), the amount of IR1 used in I1 was the same as that of the polyester P1 used in C1. The different amounts of butyl glycol arising from the different solid contents of IR1 and of dispersion P1 were compensated in the formulation I1 by corresponding addition of butyl glycol. To produce the waterborne basecoat materials I2 and I3, the procedure was the same as for I1, using the reaction products IR2 or IR3 instead of IR1.

Table 1 shows again the polyesters and reaction products, and their proportions (based on the total amount of the waterborne basecoat materials), used in waterborne basecoat materials (WBM) C1 and I1 to I3, as an overview.

TABLE 1

Compositions of WBM C1 and I1 to I3

| WBM | [% by wt.] | Reaction product |
|---|---|---|
| C1 | 4.92 | P1 |
| I1 | 4.92 | IR1 |
| I2 | 4.92 | IR2 |
| I3 | 4.92 | IR3 |

Comparison Between Waterborne Basecoat Materials C1 and I1 to I3

To determine the pinholing limit and pinhole count, multicoat paint systems were produced by the following general method:

A cathodically electrocoated steel sheet of dimensions 30×50 cm was provided with an adhesive strip on one longitudinal edge, in order to be able to determine the film thickness differences after the coating. The particular waterborne basecoat material was applied electrostatically in wedge format. The resulting waterborne basecoat film was flashed off at room temperature for four minutes and subsequently intermediately dried in a forced air oven at 70° C. for 10 minutes. A customary two-component clearcoat material was applied electrostatically in a film thickness of 35 micrometers to the dried waterborne basecoat film. The resulting clearcoat film was flashed off at room temperature for 20 minutes. The waterborne basecoat film and the clearcoat film were then cured in a forced air oven at 140° C. for 20 minutes. Following visual evaluation of the pinholes in the resulting wedge-shaped multicoat paint system, the film thickness of the pinholing limit and the number of pinholes above this film thickness (in other words, the total number of pinholes on the painted sheet) were ascertained. The results can be found in table 2.

TABLE 2

Pinholing limit and pinhole count of multicoat paint systems produced using waterborne basecoat materials C1 and I1 to I3

| WBM | Pinholing limit (micrometers) | Pinhole count |
|---|---|---|
| C1 | 22 | 25 |
| I1 | 29 | 1 |
| I2 | 31 | 10 |
| I3 | 28 | 7 |

The results emphasize the fact that the use of the reaction products of the invention or of the waterborne basecoat materials of the invention significantly increases the pinholing limit by comparison with the comparative waterborne basecoat material C1, and at the same time reduces the pinhole count.

Production of a Silver Comparative Waterborne Basecoat Material 2 (C2)

The components listed under "aqueous phase" in table B were stirred together in the order stated to form an aqueous mixture. In the next step an organic mixture was prepared from the components listed under "organic phase". The organic mixture was added to the aqueous mixture. The combined mixture was then stirred for 10 minutes and adjusted, using deionized water and dimethylethanolamine, to a pH of 8 and to a spray viscosity of 58 mPas under a shearing load of 1000 s$^{-1}$ as measured with a rotary viscometer (Rheomat RM 180 instrument from Mettler-Toledo) at 23° C.

TABLE B

| Component | Parts by weight |
|---|---|
| Aqueous phase | |
| 3% Na—Mg phyllosilicate solution | 26 |
| Deionized water | 21.7 |
| Butyl glycol | 2.8 |
| Polyurethane-modified polyacrylate; prepared as per page 7, line 55 to page 8, line 23 of DE 4437535 A | 4.5 |
| 50% strength by weight solution of Rheovis PU 1250 (BASF), rheological agent | 0.6 |
| P1 | 13.3 |
| TMDD (BASF) | 0.3 |
| Melamine-formaldehyde resin (Cymel 203 from Cytec) | 4.1 |
| 10% dimethylethanolamine in water | 0.3 |
| polyurethane-based graft copolymer; prepared as per page 19, line 44 to page 20, line 21 of DE 19948004 A, solids content adjusted to 32.5 wt % with deionized water | 1.8 |
| TMDD (BASF) | 1.6 |
| 3% strength by weight aqueous Rheovis AS S130 solution; rheological agent, available from BASF | 3.9 |
| Organic phase | |
| Mixture of two commercial aluminum pigments, available from Altana-Eckart | 6.2 |
| Butyl glycol | 7.5 |
| P1 | 5 |

Preparation of an Inventive Waterborne Basecoat Material 4 (I4)

In the same way as for the preparation of I1 to I3, inventive basecoat material I4 was produced using the reaction product IR1 on the basis of the comparative basecoat material C2 (table B) and with replacement of the polyester dispersion P1. Compensation for the different solid content in relation to the polyester dispersion P1 took place again by corresponding addition of butyl glycol.

TABLE 3

Compositions of WBM C2 and I4

| WBM | [% by wt.] | Reaction product |
|---|---|---|
| C2 | 10.98 | P1 |
| I4 | 10.98 | IR1 |

Comparison Between Waterborne Basecoat Materials C2 and I4

As above for the multicoat paint systems produced using waterborne basecoat materials C1 and I1 to I3, multicoat paint systems were produced using aqueous basecoat materials C2 and I4. The evaluation in terms of pinholing limit and pinhole count also took place in the same way. The results can be found in table 4.

TABLE 4

Pinholing limit and pinhole count of multicoat paint systems produced using waterborne basecoat materials C2 and I4

| WBM | Pinholing limit (micrometers) | Pinhole count |
|---|---|---|
| C2 | 14 | 63 |
| I4 | 29 | 13 |

The results again emphasize the fact that the use of the reaction products of the invention or of the waterborne basecoat materials of the invention significantly increases the pinholing limit by comparison with the comparative waterborne basecoat material C2, and at the same time reduces the pinhole count.

The invention claimed is:

1. A pigmented aqueous basecoat material, comprising: a polyether-based reaction product which is prepared by a reaction of
 (a) at least one diisocyanate of the formula (I)

in which
 Y is a divalent aliphatic, aromatic or araliphatic hydrocarbon radical having from 6 to 30 carbon atoms, with
 (b) at least one polyether of the general structural formula (II)

in which
 R is a $C_3$ to $C_6$ alkylene radical and n is selected accordingly such that the polyether (b) possesses a number-average molecular weight of 200 to 4 000 g/mol,
 wherein components (a) and (b) are used in the reaction in a molar ratio of 0.7/2.3 to 1.6/1.7 and the resulting reaction product possesses a number-average molecular weight of 500 to 15 000 g/mol and an isocyanate content of less than 0.2%.

2. The pigmented aqueous basecoat material as claimed in claim 1, wherein the polyether (b) possesses a number-average molecular weight of 800) to 3 200 g/mol.

3. The pigmented aqueous basecoat material as claimed in claim 1, wherein the group R in the general structural formula (II) comprises tetramethylene radicals.

4. The pigmented aqueous basecoat material as claimed in claim 1, wherein components (a) and (b) are used in a molar ratio of 0.9/2.1 to 1.5/1.8.

5. The pigmented aqueous basecoat material as claimed in claim 1, wherein the polyether-based reaction product possesses a number-average molecular weight of 1 250 to 5 000 g/mol.

6. The pigmented aqueous basecoat material as claimed in claim 1, wherein the divalent radical Y is an aromatic or araliphatic radical.

7. The pigmented aqueous basecoat material as claimed in claim 1, wherein the divalent radical Y is a saturated aliphatic radical.

8. The pigmented aqueous basecoat material as claimed in claim 6, wherein the divalent radical Y has from 6 to 15 carbon atoms.

9. The pigmented aqueous basecoat material as claimed in claim 1, wherein the sum total of the weight-percentage fractions, based on the total weight of the pigmented aqueous basecoat material, of all the polyether-based reaction products is 0.1 to 30 wt %.

10. The pigmented aqueous basecoat material as claimed in claim 1, which comprises a polyurethane resin that is grafted with olefinically unsaturated monomers and that also comprises hydroxyl groups, and a melamine resin.

11. A method for producing a multicoat paint system, the method comprising:
(1) applying a pigmented aqueous basecoat material to a substrate,
(2) forming a polymer film from the coating material applied in stage (1),
(3) applying a clearcoat material to the resulting basecoat film, and then
(4) curing the basecoat film together with the clearcoat film,
wherein a pigmented aqueous basecoat material as claimed in claim 1 is used in stage (1).

12. The method as claimed in claim 11, wherein the substrate is a metallic substrate coated with a cured electrocoat film, and all of the films applied to the electrocoat film are cured jointly.

13. A multicoat paint system produced by the method as claimed in claim 11.

14. A method of improving stability of paint, the method comprising:
adding a polyether-based reaction product to a paint that comprises a basecoat material, wherein
the polyether-based reaction product is obtained by reaction of:
(a) at least one diisocyanate of the formula (I)

OCN—Y—NCO        (I)

in which
Y is a divalent aliphatic, aromatic or araliphatic hydrocarbon radical having from 6 to 30 carbon atoms,
with
(b) at least one polyether of the general structural formula (II)

(II)

in which
R is a $C_3$ to $C_6$ alkylene radical and n is selected accordingly such that the polyether (b) possesses a number-average molecular weight of 200 to 4 000 g/mol,
wherein components (a) and (b) are used in the reaction in a molar ratio of 0.7/2.3 to 1.6/1.7 and the resulting reaction product possesses a number-average molecular weight of 500 to 15 000 g/mol and an isocyanate content of less than 0.2%.

* * * * *

UNITED STATES PATENT AND TRADEMARK OFFICE
CERTIFICATE OF CORRECTION

PATENT NO. : 10,472,541 B2
APPLICATION NO. : 15/322321
DATED : November 12, 2019
INVENTOR(S) : Bernhard Steinmetz et al.

Page 1 of 1

It is certified that error appears in the above-identified patent and that said Letters Patent is hereby corrected as shown below:

In the Specification

In Column 3, Line 34, delete "isocyanato-methyl" and insert -- isocyanatomethyl --, therefor.

In Column 3, Line 37, delete "trimethylhexa-methylene" and insert -- trimethylhexamethylene --, therefor.

In Column 3, Line 41, delete "tetramethylxylylene" and insert -- tetramethylxylene --, therefor.

In Column 3, Lines 46-47, delete "tetramethylxylylene" and insert -- tetramethylxylene --, therefor.

In Column 11, Line 61, delete "5130" and insert -- S130 --, therefor.

In Column 17, Lines 61-62, delete "tetramethylxylylene" and insert -- tetramethylxylene --, therefor.

In Column 18, Line 49, delete "Desmodur-W" and insert -- Desmodur W --, therefor.

In Column 21, Line 44, delete "14" and insert -- I4 --, therefor.

In the Claims

In Column 22, Line 48, Claim 2, delete "800)" and insert -- 800 --, therefor.

Signed and Sealed this
Twenty-fourth Day of November, 2020

Andrei Iancu
*Director of the United States Patent and Trademark Office*